(12) United States Patent
Kim

(10) Patent No.: US 7,289,804 B2
(45) Date of Patent: Oct. 30, 2007

(54) METHOD FOR CONTROLLING SLEEP INTERVAL IN BROADBAND WIRELESS ACCESS COMMUNICATION SYSTEM

(75) Inventor: Jae-Hyoung Kim, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 87 days.

(21) Appl. No.: 10/876,887

(22) Filed: Jun. 25, 2004

(65) Prior Publication Data

US 2005/0070340 A1    Mar. 31, 2005

(30) Foreign Application Priority Data

Sep. 26, 2003    (KR)    ............... 10-2003-0067085

(51) Int. Cl.
*H04Q 7/20*     (2006.01)
(52) U.S. Cl. ............................................. 455/432.1
(58) Field of Classification Search ............ 455/426.1, 455/426.2, 574
See application file for complete search history.

(56) References Cited

U.S. PATENT DOCUMENTS

| | | | | |
|---|---|---|---|---|
| 6,085,090 | A * | 7/2000 | Yee et al. ................. | 455/440 |
| 6,192,230 | B1 * | 2/2001 | van Bokhorst et al. .. | 455/343.3 |
| 6,639,907 | B2 * | 10/2003 | Neufeld et al. ............ | 370/342 |
| 6,735,454 | B1 * | 5/2004 | Yu et al. ................... | 455/574 |
| 6,829,493 | B1 * | 12/2004 | Hunzinger ................. | 455/574 |

FOREIGN PATENT DOCUMENTS

| | | |
|---|---|---|
| GB | 2 344 202 | 5/2000 |
| WO | WO 00/70814 | 11/2000 |
| WO | WO 02/089428 | 11/2002 |

OTHER PUBLICATIONS

Kitroser, "Sleep Mode and Handoff Corrections for Task Group e", IEEE 802.16 Broadband Wireless Access Working Group, Sep. 5, 2003.

\* cited by examiner

*Primary Examiner*—Lester G. Kincaid
*Assistant Examiner*—Gary Au
(74) *Attorney, Agent, or Firm*—The Farrell Law Firm, P.C.

(57) ABSTRACT

Disclosed is a method for establishing a sleep mode in a broadband wireless access communication system. The method for establishing the sleep mode includes a first step of placing a subscriber station into the awake mode after time having a maximum window value lapses, determining whether or not a message representing that there exists data to be transmitted from a base station, placing the subscriber station into the sleep mode when the received message represents that there does not exists data to be transmitted from a base station, and establishing a window value for a present sleep mode based on than a preset window value of a previous sleep mode loop within the maximum window value.

12 Claims, 12 Drawing Sheets

METHOD FOR CONTROLLING SLEEP INTERVAL IN BROADBAND WIRELESS ACCESS COMMUNICATION SYSTEM

PRIORITY

This application claims priority to an application entitled "Method For Controlling Sleep Interval In Broadband Wireless Access Communication System" filed in the Korean Intellectual Property Office on Sep. 26, 2003 and assigned Ser. No. 2003-67085, the contents of which are hereby incorporated by reference.

BACKGROUND OF THE INVENTION

1. Field of the Invention

The present invention relates to a broadband wireless access communication system, and more particularly to a method for controlling a sleep mode and an awake mode in a broadband wireless access communication system using an orthogonal frequency division multiplexing method.

2. Description of the Related Art

The 4th generation (hereinafter, referred to as '4G') communication system, which is a next generation communication system, is being actively developed in order to provide services having different Quality of Service (hereinafter, referred to as 'QoS') levels. The transmission rate of the 4G communication system is about 100 Mbps.

Currently, the 3rd generation (hereinafter, referred to as '3G') communication system usually provides a transmission speed of about 384 kbps under an outdoor channel environment which is a relatively-inferior channel environment and provides a transmission speed of about 2 Mbps under an indoor channel environment which is a relatively-superior channel environment. Also, a wireless local area network (hereinafter, referred to as 'LAN') system and a wireless metropolitan area network (hereinafter, referred to as 'MAN') system generally provides transmission speeds of about 20 Mbps to 50 Mbps.

A new communication system, which is achieved by supplementing the wireless LAN and MAN systems to combine a relatively-high transmission speed with mobility and QoS, has been developed in the current 4G communication system.

The wireless MAN system is suitable for high-speed communication services because it has a wide service coverage area and provides a high transmission speed. However, since the wireless MAN system can not compensate for the mobility of a subscriber station SS, handoff techniques are not being considered in the wireless MAN system.

A structure of an IEEE 802.16a communication system, which is a standard specification of the wireless MAN system, will be described with reference to FIG. 1. FIG. 1 is a diagram illustrating a structure of a broadband wireless access communication system using orthogonal frequency division multiplexing/orthogonal frequency division multiple access methods. Particularly, FIG. 1 illustrates the structure of the IEEE 802.16a communication system.

It is noted that a wireless MAN system is a type of broadband wireless access communication system (BWA) capable of providing a wider service coverage area and a higher transmission speed than those of a wireless LAN system. To support a broadband transmission network, the IEEE 802.16a communication system applies an orthogonal frequency division multiplexing (hereinafter, referred to as OFDM) method and an orthogonal frequency division multiplex access (hereinafter, referred to as OFDMA) method to a physical channel of the wireless MAN system.

The IEEE 802.16a communication system utilizes the OFDM/OFDMA methods. Since the IEEE 802.16a communication system applies the OFDM/OFDMA method to the MAN system, it is possible for the IEEE 802.16a communication system to transmit a physical channel signal by using a plurality of sub-carriers in order to transmit high-speed data.

An IEEE 802.16e communication system supplements the above-described IEEE 802.16a communication system with methods to compensate for the mobility of the subscriber station. However, the current IEEE 802.16e communication system has yet to be standardized in detail.

As a result, both IEEE 802.16a and IEEE 802.16e communication systems are broadband wireless access communication systems using the OFDM/OFDMA methods. For the purpose of explaining basic operations, only the IEEE 802.16a communication system will be described below as an example.

Since the IEEE 802.16e communication system supplements the subscriber station to compensate for the mobility of a subscriber terminal (SS (Subscriber Station)), an MS (Mobile Station) or an MSS (Mobile Subscriber Station).

Referring to FIG. 1, the IEEE 802.16a communication system has a single cell structure including a base station BS 10 and a plurality of subscriber stations 21 to 23, which are managed by the base station 10. The base station 10 communicates with the subscriber stations 21 to 23 through the OFDM/OFDMA methods.

As stated earlier, the IEEE 802.16a communication system does not compensate for the mobility of the subscriber stations. The above IEEE 802.16a communication system is based on a fixed state of the subscriber stations and a single cell structure. As described above, the IEEE 802.16e communication system is a system achieved by supplementing the IEEE 802.16a communication system with means to compensate for the mobility of the subscriber stations. Accordingly, the IEEE 802.16e communication system is required to consider the mobility of the subscriber stations under a multi-cell environment. To provide mobility to the subscriber stations under such a multi-cell environment, it is necessary to change the operating mode of the subscriber stations and the base station.

Power consumption of the subscriber stations becomes a major factor to consider as the power consumption influences the overall IEEE 802.16e communication system operation. In order to minimize power consumption of the subscriber stations, a sleep mode and an awake mode, which are performed between the subscriber stations and the base station, have been proposed for the IEEE 802.16e communication system.

The sleep mode proposed by the IEEE 802.16e communication system will be described with reference to FIG. 2. [PLEASE LABEL FIG. 2 "PRIOR ART".]->o.k. FIG. 2 is a diagram illustrating the sleep mode operation proposed by the IEEE 802.16e communication system.

It is noted that the sleep mode has been proposed in order to minimize power consumption of the subscriber stations during an idle interval, during which packet data is not transmitted. The subscriber stations and the base station simultaneously perform a mode change into the sleep mode in such a manner that power consumption of the subscriber stations is minimized through the sleep mode during the idle interval in which packet data is not transmitted.

Since the packet data is transmitted in bursts, power would be wasted during an interval in which the packet data is not being transmitted if the operating modes are the same as during an interval in which the packet data is transmitted. For this reason, the sleep mode has been proposed.

If packet data is to be transmitted when the base station and the subscriber stations are in the sleep mode, the base station and the subscriber stations simultaneously change modes into the awake modes to transmit/receive the packet data.

In addition to the power saving features, the sleep mode operation has been proposed for minimizing interference between channel signals. Also, the sleep mode operation must be capable of flexible operation consider traffic characteristics and transmission mode characteristics of the packet data, because the characteristics of the packet data are greatly affected by the traffic.

Referring to FIG. 2, reference numeral 31 represents a packet data generation pattern. The packet data generation pattern includes a plurality of 'on' intervals and 'off' intervals. The 'on' intervals are burst intervals during which the packet data is generated and the 'off' intervals are idle intervals during which no packet data is generated.

The subscriber stations and the base station perform the mode change between the sleep mode and the awake mode to coincide with the packet data generation pattern so that power consumption of the subscriber stations is minimized and mutual interference between channel signals is eliminated.

Reference numeral 33 represents a mode change pattern of the base station and the subscriber stations. The mode change pattern includes a plurality of awake modes and sleep modes. In the awake modes, the packet data is generated. The base station and the subscriber stations communicate with each other through the packet data in the awake mode. In contrast, the packet data is not generated in the sleep modes. The base station and the subscriber stations do not communicate with each other through packet data in the sleep mode.

Reference numeral 35 represents a power level pattern of the subscriber station SS POWER LEVEL. As represented by reference numeral 35, the SS POWER LEVEL of the awake mode is represented as 'K' and the SS POWER LEVEL of the sleep mode is represented as 'M'. When comparing the SS POWER LEVEL of the sleep mode 'M' with the SS POWER LEVEL of the awake mode 'K', the value of 'M' is much less than that of 'K'. Since there is no transmission/reception of the packet data during the sleep mode the power consumption is at a minimum.

Methods for supporting the sleep mode operation, which has been proposed by the IEEE 802.16e communication system, will be described.

The subscriber stations must obtain approval below the base station for the mode change into the sleep mode. The base station is required to perform a buffering operation and a dropping operation for the packet data to be transmitted while approving the mode change of the subscriber stations into the sleep mode.

The base station is required to notify the subscriber stations if the existence of the packet data to be transmitted during a listening interval of the subscriber stations. At this time, the subscriber stations are required to awake from the sleep mode and check for the existence of the packet data to be transmitted thereto from the base station. The listening interval will be described in detail further below.

The subscriber station awakes during a listening interval. If the subscriber stations detect that packet data is to be transmitted thereto from the base station as a result of inspection during the listening interval, the subscriber stations remains in the awake mode to receive the packet data from the base station. In contrast, if the subscriber stations detect that no packet data is to be transmitted thereto from the base station as a result of the inspection, the subscriber stations may return to the sleep mode after the listening interval or continuously maintain the awake mode.

Parameters required for supporting the sleep mode and the awake mode are as follows:

(1) Sleep Interval

A subscriber station requests a sleep interval. The sleep interval is assigned by the base station according to a request from the subscriber station. Also, the sleep interval represents a time interval required for the subscriber station to perform the mode change into the sleep mode and again to perform the mode change into the awake mode. That is, the sleep interval is defined as a sleep mode operating time of the subscriber station. The subscriber station may continuously maintain the sleep mode after the sleep interval. The sleep interval is updated by performing an exponentially increasing algorithm with using a predetermined minimum window MIN-WINDOW value and a predetermined maximum window MAX-WINDOW value.

The minimum window value represents a minimum value of the sleep interval and the maximum window value represents a maximum value of the sleep interval. Also, the minimum value and the maximum value, represented in terms of a number of frames, are assigned by the base station. The minimum window value and the maximum window value will be described in further detail below.

(2) Listening Interval

A listening interval is requested for the subscriber station. The listening interval can be assigned by the base station according to the request of the subscriber station. The listening interval represents a time interval required for the subscriber station to receive downlink messages (e.g., a traffic indicator TRF-IND message) from the base station after awaking from the sleep mode.

The TRF-IND message is a traffic message transmitted to the subscriber station (i.e., a message indicating the existence of packet data). The TRF-IND message will be described below in further detail. The subscriber station determines whether to maintain the awake mode or to perform the mode change into the sleep mode again according to value of the TRF-IND message.

(3) Sleep Interval Update Algorithm

When the subscriber station performs the mode change into the sleep mode, the subscriber station regards the predetermined minimum window value as a minimum sleep mode period in order to determine the sleep interval. After the sleep interval elapses, the subscriber station awakes from the sleep mode and checks determines if packet data exists to be transmitted from the base station.

After the subscriber station confirms that there is no packet data to transmit, the subscriber station sets the sleep interval to double that of the previous sleep interval. The subscriber station maintains the sleep mode during the set sleep interval and awakes from the sleep mode often,the set sleep interval.

For example, if the minimum window value is '2', the subscriber station establishes an initial sleep interval as two frames and maintains the sleep mode during the sleep interval of two frames. After the sleep interval of the two frames elapses, the subscriber station awakes from the sleep mode and then determines whether or not the traffic indicator message is received. As a result of the determination, if the traffic indicator message is not received (that is, the subscriber station confirms that there is no packet data to be transmitted from the base station), the subscriber station establishes the sleep interval as four frames, which is double that of the previous two frames established in the previous initial sleep interval.

The subscriber station repeatedly performs the sleep mode and the awake mode while increasing the sleep interval from the minimum window value up to the maximum window value within a maximum window time interval. An operation increasing the sleep interval whenever the subscriber station enters into the sleep mode is called "sleep interval update algorithm".

The following are messages defined in the IEEE 802.16e communication system to support the above-described sleep mode operation and awake mode operation.

(1) Sleep-Request Message

A sleep request message is transmitted from the base station to the subscriber station for requesting the subscriber station to change into the sleep mode.

The sleep request message includes parameters, which are information elements (Ies), required for the subscriber station to operate in the sleep mode. The format of the sleep request message is represented in following Table 1.

TABLE 1

| SYNTAX | SIZE | NOTES |
|---|---|---|
| SLP-REQ_MESSAGE_FORMAT( ) { | | |
| MANAGEMENT MESSAGE TYPE=45 | 8 bits | |
| MIN-WINDOW | 6 bits | |
| MAX-WINDOW | 10 bits | |
| LISTENING INTERVAL | 8 bits | |
| } | | |

The sleep request message is a dedicated message transmitted on the basis of a connection identification CID of the subscriber station. Hereinafter, each IE of the sleep request message shown in Table 1 will be described.

The management message type MANAGEMENT MESSAGE TYPE, describes a type of a message which is currently being transmitted. For example, the management message type '45' (MANAGEMENT MESSAGE TYPE=45) corresponds to the SLP-REQ message.

The minimum window value represents a start value requested for the sleep interval (measured in frames). The maximum window MAX-WINDOW represents a stop value requested for the sleep interval (measured in frames). As described in the sleep interval update algorithm, the sleep interval can be updated to a value between the minimum window value and the maximum window value. As a general rule, the minimum window value is set to 2 ms and the maximum window value is set to 5 ms.

The listening interval LISTENING INTERVAL represents a requested listening interval LISTENING INTERVAL (measured in frames). The listening interval is also represented in frames.

(2) SLP_RSP: Sleep-Response Message

The sleep response message is a response message for the sleep request message. The sleep response message can be used to represent whether or not the base station approves or denies the mode change into the sleep mode requested by the subscriber station. Also, the sleep response message can be used to represent an unsolicited instruction.

The case where the sleep request message is used as the unsolicited instruction will be described below. The sleep response message includes information required for the subscriber station to operate in the sleep mode. The format of the sleep response message is represented in following Table 2.

TABLE 2

| SYNTAX | SIZE | NOTES |
|---|---|---|
| SLP-REP_MESSAGE_FORMAT( ) { | | |
| MANAGEMENT MESSAGE TYPE=46 | 8 bits | |
| SLEEP-APPROVED | 1 bits | 0: SLEEP-MODE REQUEST DENIED 1: SLEEP-MODE REQUEST APPROVED |
| IF(SLEEP-APPROVED)==0 | | |
| RESERVED | 7 bits | |
| } ELSE { | | |
| START-TIME | 7 bits | |
| MIN-WINDOW | 6 bits | |
| MAX-WINDOW | 10 bits | |
| LISTENING INTERVAL | 8 bits | |
| } | | |
| } | | |

The sleep response message is also a dedicated message transmitted on the basis of the connection identification of the subscriber station. Hereinafter, each IE of the sleep response message shown in Table 2 will be described.

The management message type MANAGEMENT MESSAGE TYPE represents the type of a message which is currently being transmitted. For example, the management message type '46' (MANAGEMENT MESSAGE TYPE=46) corresponds to the SLP-RSP message.

The sleep approved SLEEP-APPROVED value is one bit. A sleep approved value of '0' represents that the mode change into the sleep mode is denied. A sleep approved value of '1' represents that the mode change into the sleep mode is approved. If the sleep approved value is '0', is the sleep response message contains a reservation field having 7 bits. If the sleep approved value is '1', is the sleep response message contains a start time value, the minimum window value, the maximum window value, and the listening interval.

The start time START-TIME value is the number of frames before the subscriber station enters into the first sleep interval (the first SLEEP INTERVAL), and the frame receiving the sleep response message is not included in the frames. That is, the subscriber station performs the mode change into the sleep mode after a predetermined number of frames elapse, in which the predetermined number of frames extend from a frame prior to the frame receiving the sleep response message to a frame corresponding to the start time.

The minimum window MIN-WINDOW value represents a start value for the SLEEP INTERVAL (measured in frames). The maximum window MAX-WINDOW represents a stop value for the SLEEP INTERVAL (measured in frames). The listening interval LISTENING INTERVAL represents a value for the listening interval (measured in frames).

(3) Traffic Indication Message

The traffic indication message is transmitted to the subscriber station by the base station during the listening interval and indicates the existence of packet data to be transmitted to the subscriber station by the base station. The format of the traffic indication message is represented in following Table 3.

TABLE 3

| SYNTAX | SIZE | NOTES |
|---|---|---|
| TRF-IND_MESSAGE_FORMAT( ) { | | |
| MANAGEMENT MESSAGE TYPE=47 | 8 bits | |
| POSITIVE_INDICATION_LIST ( ){ | | TRAFFIC HAS BEEN ADDRESSED TO THE SS |
| NUM-POSITIVE | 8 bits | |
| For (I=0;I<NUM-POSITIVE; I++){ | | |
| CID | 16 bits | BASIC CID OF THE SS |
| } | | |
| } | | |
| } | 128 | |

The traffic indication message is transmitted in a broadcasting method, which is different from the transmitting methods for the sleep request message and the sleep response message. The traffic indication message indicates whether or not there exists packet data to be transmitted to predetermined subscriber stations by the base station. The subscriber station decodes the broadcasted traffic indication message and determines whether to perform the mode change into the awake mode or to maintain the sleep mode. The subscriber station awakens for the above process.

If the subscriber station performs the mode change into the awake mode, the subscriber station performs a frame synchronization. If a frame sequence number of packet data transmitted to the subscriber station does not coincide with a frame sequence number expected by the subscriber station, the subscriber station can request that the packet data be re-transmitted. In contrast, if the subscriber station does not receive the traffic indication message during the listening interval, the subscriber station returns to the sleep mode. Although the subscriber station receives the traffic indication message, if the traffic indication message does not include a positive indication POSITIVE INDICATION (i.e. includes a negative indication NEGATIVE INDICATION) the subscriber station also returns to the sleep mode.

Each IE of the traffic indication message shown in Table 3 will be described. The management message type MANAGEMENT MESSAGE TYPE indicates the type of a message which is currently transmitted. For example, the management message type '47' (MANAGEMENT MESSAGE TYPE=47) represents the traffic indication message. The positive indication list POSITIVE_INDICATION_LIST includes the number of positive subscribers NUM-POSITIVE and connection identification of each positive subscriber. The positive indication list represents the number of the subscriber stations to which packet data will be transmitted and connection identifications of the subscriber stations.

Referring to FIG. 3, an operation that the subscriber station performs the mode change into the sleep mode according to a request of the subscriber station request will be described. FIG. 3 is a diagram illustrating a mode change procedure of a subscriber station into a sleep mode which has been proposed by the IEEE 802.16e communication system.

If a subscriber station 40 determines that a mode change into the sleep mode is required, the subscriber station 40 transmits the sleep request message to a base station 50 (S31). The sleep request message includes the information elements described in Table 1. The base station 50, which has received the sleep request message from the subscriber station 40, determines operating conditions of the subscriber station 40 and the base station 50, and determines whether or not to approve the mode change of the subscriber station 40 into the sleep mode. As a result of the determination, the base station 50 transmits the sleep response message to the subscriber station 40 (S33).

The base station 50 determines whether or not there is packet data to be transmitted to the subscriber station 40, and determines whether or not to approve the mode change of the subscriber station 40 into the sleep mode. As described in Table 2, if the base station 50 approves of the mode change into the sleep mode, the SLEEP-APPROVED value is set as '1'. In contrast, if the base station 50 denies the mode change into the sleep mode, the SLEEP-APPROVED value is set as '0'. The other information elements included in the sleep response message are the same as that described in Table 2.

The subscriber station 40, which has received the sleep response message from the base station 50, detects the SLEEP-APPROVED value, and the subscriber station 40 performs the mode change into the sleep mode when the mode change into the sleep mode is approved (S35). When the SLEEP-APPROVED value included in the sleep response message represents that the mode change into the sleep mode is denied, the subscriber station 40 maintains a current mode, that is, the awake mode.

The subscriber station 40 reads corresponding information elements from the sleep response message and performs the sleep mode operation, while performing the mode change into the sleep mode.

Next, a mode change operation of the subscriber station into the sleep mode under the control of the base station will be described with reference to FIG. 4. FIG. 4 is a diagram illustrating a mode change procedure of the subscriber station into a sleep mode under the control of the base station which has been proposed for the IEEE 802.16e based communication system.

It is noted that a current sleep response message used as a message representing the unsolicited instruction has been proposed for the IEEE 802.16e communication system. The unsolicited instruction means that the subscriber station operates according to the instruction of the base station, that is, under the control of the base station even if an additional request is not transmitted from the subscriber stations. FIG. 4 is a diagram illustrating a case where the subscriber station performs the mode change into the sleep mode according to the unsolicited instruction.

The base station 50 transmits the sleep response message to the subscriber station 40 (S41). The sleep response message includes the same information elements as described in Table 2. The subscriber station 40, which has received the sleep message from the base station 50, detects the SLEEP-APPROVED value included in the sleep response message and performs the mode change into the sleep mode when the mode change into the sleep mode is approved (S43).

Since the sleep response message is used as the unsolicited instruction in FIG. 4, the SLEEP-APPROVED value is represented as only '1'. Also, the subscriber station 40 reads corresponding information elements from the sleep response message and performs the sleep mode operation, while performing the mode change into the sleep mode.

A mode change operation of the subscriber station into the awake mode under the control of the base station will be described with reference to FIG. 5. FIG. 5 is a diagram illustrating a mode change procedure of the subscriber station into a awake mode under the control of the base station which has been proposed for use in an IEEE 802.16e based communication system.

If traffic, i.e., packet data, exists to be transmitted to the subscriber station, the base station 50 transmits the traffic indication message to the subscriber station 40 (S51).

The traffic indication message includes the same information elements as described in Table 3. The subscriber station 40, which has received the traffic indication message from the base station 50, checks whether or not the positive indication exits in the traffic indication message. If the positive indication exists, the subscriber station 40 determines is a connection identification is included in the traffic indication message.

As a result of the inspection, if the connection identification of the subscriber station 40 is included in the traffic indicator message, the subscriber station 40 performs the mode change from a current mode, that is, the sleep mode into the awake mode (S53).

FIG. 6 is a diagram illustrating the above-described sleep mode operations which have been proposed for IEEE 80.16e communication system.

A subscriber station SS 60 transmits to a base station BS 70 a message requesting the sleep mode. Parameters for the sleep request include a minimum window value, a maximum window value, and a listening interval which are established by the subscriber station 60.

The base station 70, which has received the sleep request message, establishes a sleep response message SLEEP-RESPONSE corresponding to the sleep request message and transmits the sleep response message to the subscriber station 60. At this time, the sleep response message includes a minimum window value, a maximum window value, and a listening interval, and a sleep mode starting time, which the base station 70 assigns to the subscriber station 60. Each value is expressed in frames and seconds (sec).

After the subscriber station 60, which has received the sleep response message, operates in the sleep mode during the established time starting at the sleep mode starting time, the subscriber station 60 awakes during time assigned as the listening interval. If the subscriber station 60 in the awake mode receives the traffic indication message having the negative indication from the base station 70, the subscriber station 60 reenters the sleep mode for a predetermined time, which is double that of the previous sleep interval, after the listening interval lapses. If the subscriber station 60, which maintains the awake mode during the listening interval after the sleep mode has been finished, receives the traffic indication message having the positive indication, the subscriber station 60 maintains the awake mode regardless of time, and receives data transmitted from the base station 70, which is set for the mode change into the sleep mode.

The sleep mode operations, which have been proposed for the. IEEE 802.16e communication system, have been explained above. Hereinafter, problems of the above-described sleep mode operations will be described.

As described above, the subscriber station in the sleep mode establishes the sleep interval starting from the minimum window value and checks whether or not there exits packet data to be transmitted thereto by using the traffic indication message transmitted from the base station during the listening interval after the sleep interval lapses.

If the subscriber station determines that there does not exists packet data to be transmitted thereto after checking the traffic indication message, the subscriber station increases the sleep interval by an interval double that of the previous sleep interval and maintains the sleep mode during the time corresponding to the increased sleep interval after the listening interval lapses. While the above operation of increasing the sleep interval is being continuously repeated, if there is no packet data to be transmitted to the subscriber station, the sleep interval reaches the maximum window value.

As described above, when the sleep interval reaches the maximum window value, an operation required for the subscriber station has not been yet defined. Accordingly, as described above, in a case where the sleep interval of the subscriber station reaches the maximum window value, it is necessary for the subscriber station and the base station to effectively cope with the case by considering packet transmission conditions.

FIG. 7 is a diagram illustrating a conventional sleep mode. It is assumed that the minimum window value is 2 ms, the maximum window value is 5 ms, and the listening interval is 2 ms.

As shown in FIG. 7, the subscriber station maintains the sleep mode during the first stage of 2 ms. After the first stage lapses, the subscriber station maintains the listening interval while powering on for the next 2 ms. The subscriber station maintains the second sleep mode after the listening interval of 2 ms. The sleep interval for the second sleep mode is 4 ms (=2 ms*2). After the sleep interval of 4 ms, the subscriber station maintains the listening interval while powering on for the next 2 ms.

After the listening interval of 2 ms, the subscriber station maintains a third sleep mode. At this time, the sleep interval for the third sleep mode is 8 ms (=4 ms*2). After the sleep interval of 8 ms, the subscriber station maintains the listening interval while powering on for the next 2 ms.

According to the above procedures, the last sleep mode of the subscriber station is a 12th sleep interval. At this time, the sleep interval for the sleep mode is 4.096 s, which is a integer interger of 2 ms.

Meanwhile, the minimum window value and the maximum window value are assigned to the subscriber station. The minimum window value and the maximum value are always maintained as an assigned value. Accordingly, the current state of the art has a problem in that even if it is unnecessary for data transmission to be performed between the subscriber station and the base station, the subscriber station is required to maintain the awake mode during the assigned time. Also, the current state of the art has a problem in that power save, which is an ultimate object of the sleep mode, is not efficiently achieved, because the subscriber station is required to be maintained in the awake mode during the assigned time even if it is unnecessary for data transmission to be performed between the subscriber station and the base station.

SUMMARY OF THE INVENTION

Accordingly, the present invention is proposed to solve the above-mentioned problems occurring in the prior art, and a first object of the present invention is to provide a method for establishing a sleep interval of a broadband wireless access communication system, which is capable of establishing the sleep interval depending on communication traffic conditions for data transmission between a base station and a subscriber station.

A second object of the present invention is to provide a method for establishing a sleep interval which can re-establish the sleep interval by considering communication traffic conditions for data transmission between a base station and a subscriber station by repeating the sleep mode up to the maximum window value after the sleep interval for the sleep mode reaches a maximum window value from a minimum window value.

A third object of the present invention is to provide a method for establishing a sleep interval, which is capable of efficiently saving power of a system whenever a sleep mode loop is performed.

In order to accomplish the above and other objects, there is provided a method for establishing a sleep interval of a sleep mode in a broadband wireless access communication system, the method comprising the steps of: placing a subscriber station into an awake mode when a preset time of a maximum window value lapses, and determining by the subscriber station if a first message representing that no data is to be transmitted is received from a base station; and placing the subscriber station into the sleep mode when the subscriber station receives the first message, and establishing a minimum window value for a present sleep mode to be greater than a predetermined minimum window value of a previous sleep mode loop within the maximum window value, wherein the previous sleep mode loop repeatedly performs the sleep mode from the preset minimum window value to the maximum window value, and the subscriber station performs a present sleep mode loop until the sleep mode of the maximum window value starting from the established minimum window value is finished.

According to the preferred embodiment of the present invention, when the sleep interval reaches the maximum window value from the minimum window value through performing the sleep mode, the sleep mode loop is carried out so as to set the minimum window value as integer multiple of the initial minimum window value. In addition, on the basis of the predetermined minimum window value, the sleep mode loop is repeatedly carried out such that the sleep mode is performed until the sleep interval reaches the maximum window value. At this time, whenever the sleep mode loop is repeated, the minimum window value is established at multiples of the minimum window value of the previous sleep mode loop. Even if the sleep interval starting from the minimum window value reaches the maximum window value, the sleep mode loop is realized. The sleep interval can be established depending on communication traffic conditions for data transmission carried out between the base station and the subscriber station.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
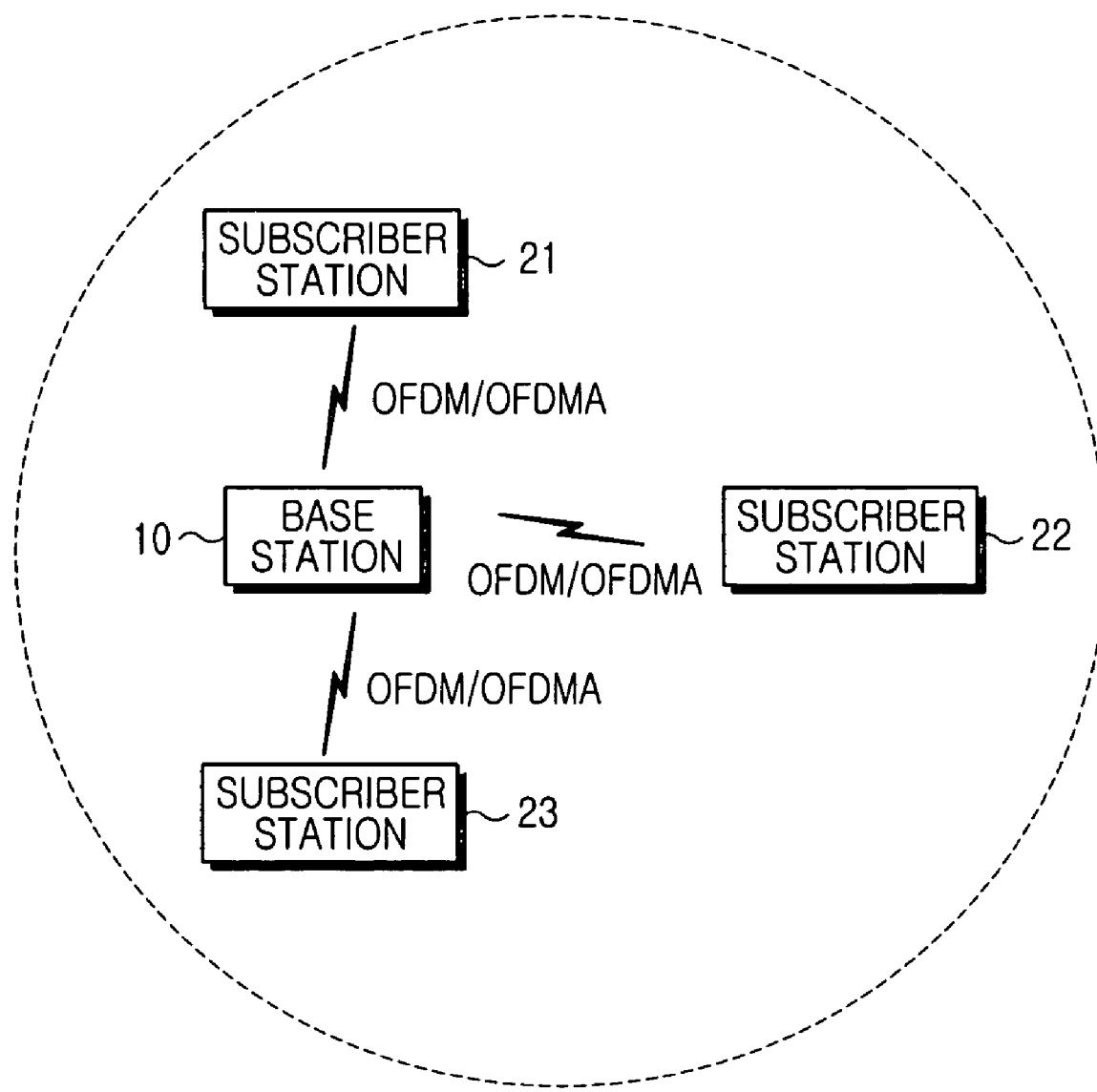
FIG. 1 is a diagram of a structure of a broadband wireless access communication system using an orthogonal frequency division multiplexing method and an orthogonal frequency division multiplex access method.
Figure 2:
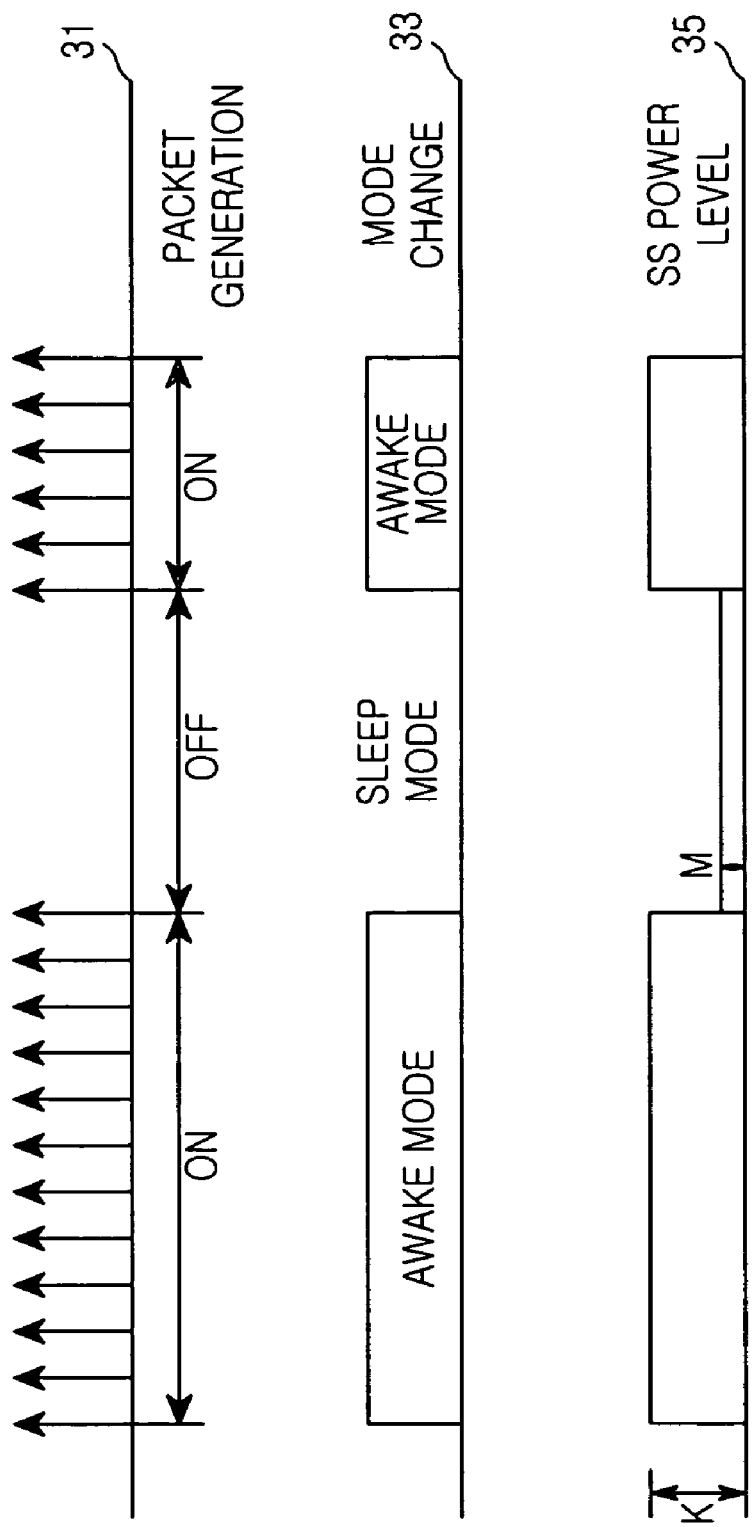
FIG. 2 is a diagram of a sleep mode operation proposed for the IEEE 802.16e communication system.
Figure 3:
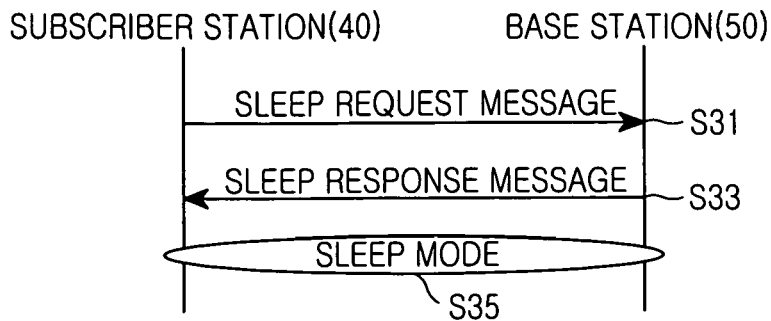
FIG. 3 is a diagram of a mode change procedure of a subscriber station into a sleep mode depending on a request of a subscriber station which has been proposed for IEEE 802.16e communication system.
Figure 4:
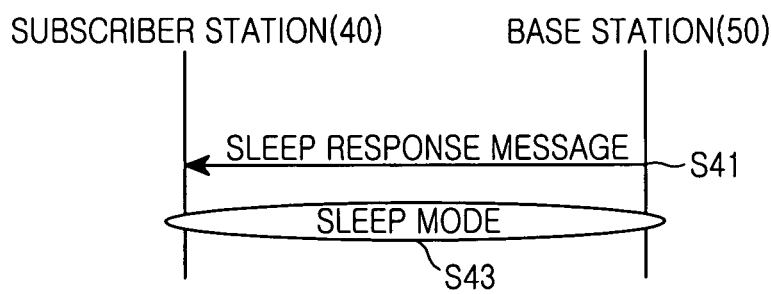
FIG. 4 is a diagram of a mode change procedure of a subscriber station into the sleep mode under the control of a base station control which has been proposed for IEEE 802.16e communication system.
Figure 5:
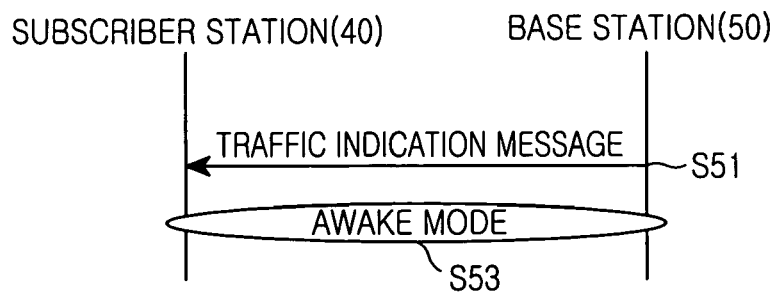
FIG. 5 diagram illustrating the mode change procedure of a subscriber station into an awake mode under the control of a base station control which has been proposed for IEEE 802.16e communication system.
Figure 6:
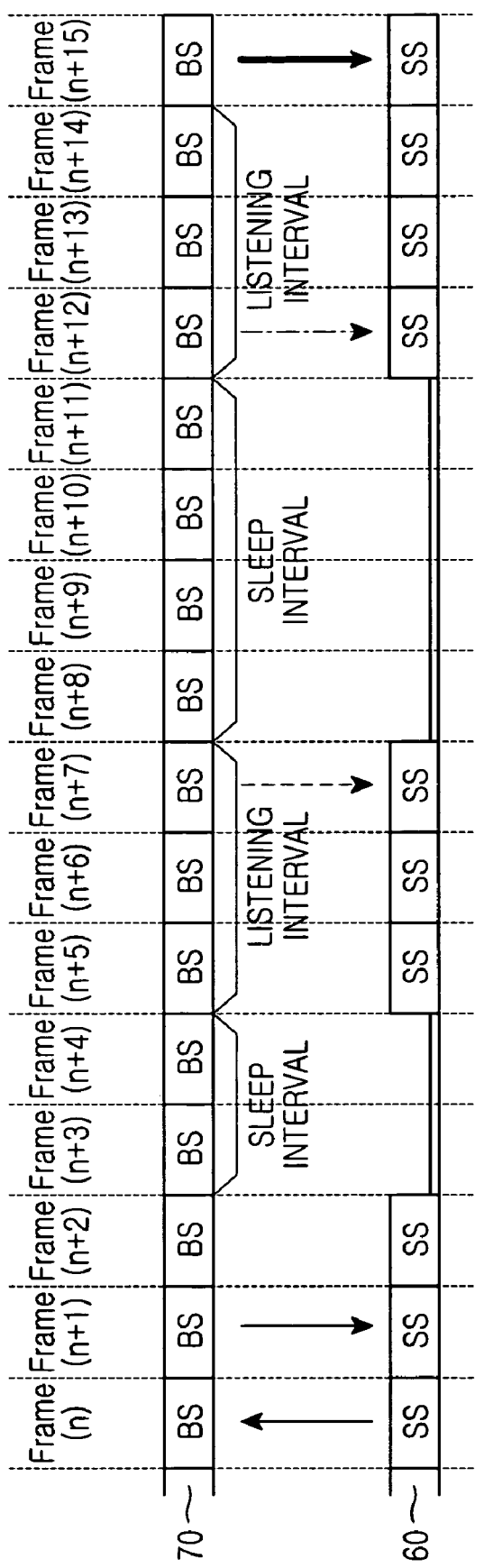
FIG. 6 is a diagram illustrating sleep mode operations proposed for IEEE 80.16e communication system.
Figure 7:
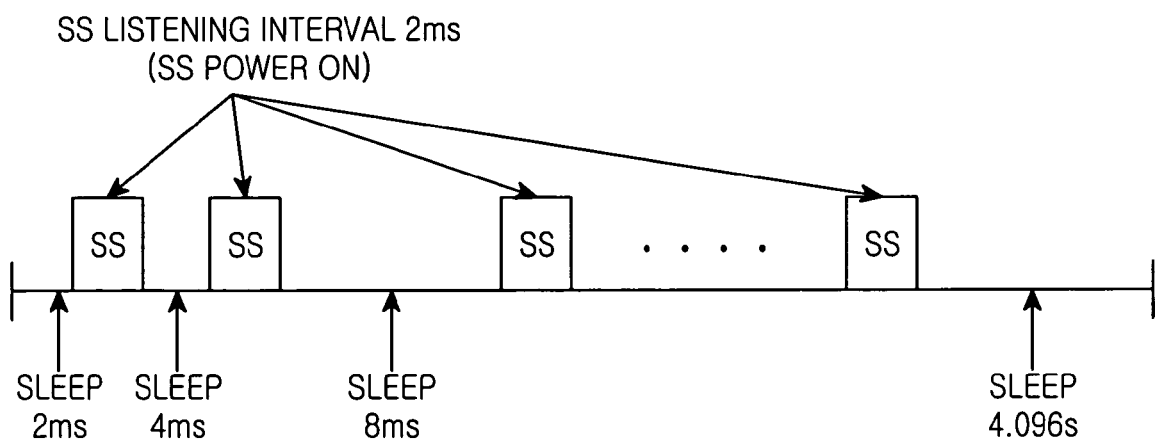
FIG. 7 is a diagram illustrating a conventional sleep mode.

Hereinafter, preferred embodiments of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may obscure the subject matter of the present invention.

Figure 8:
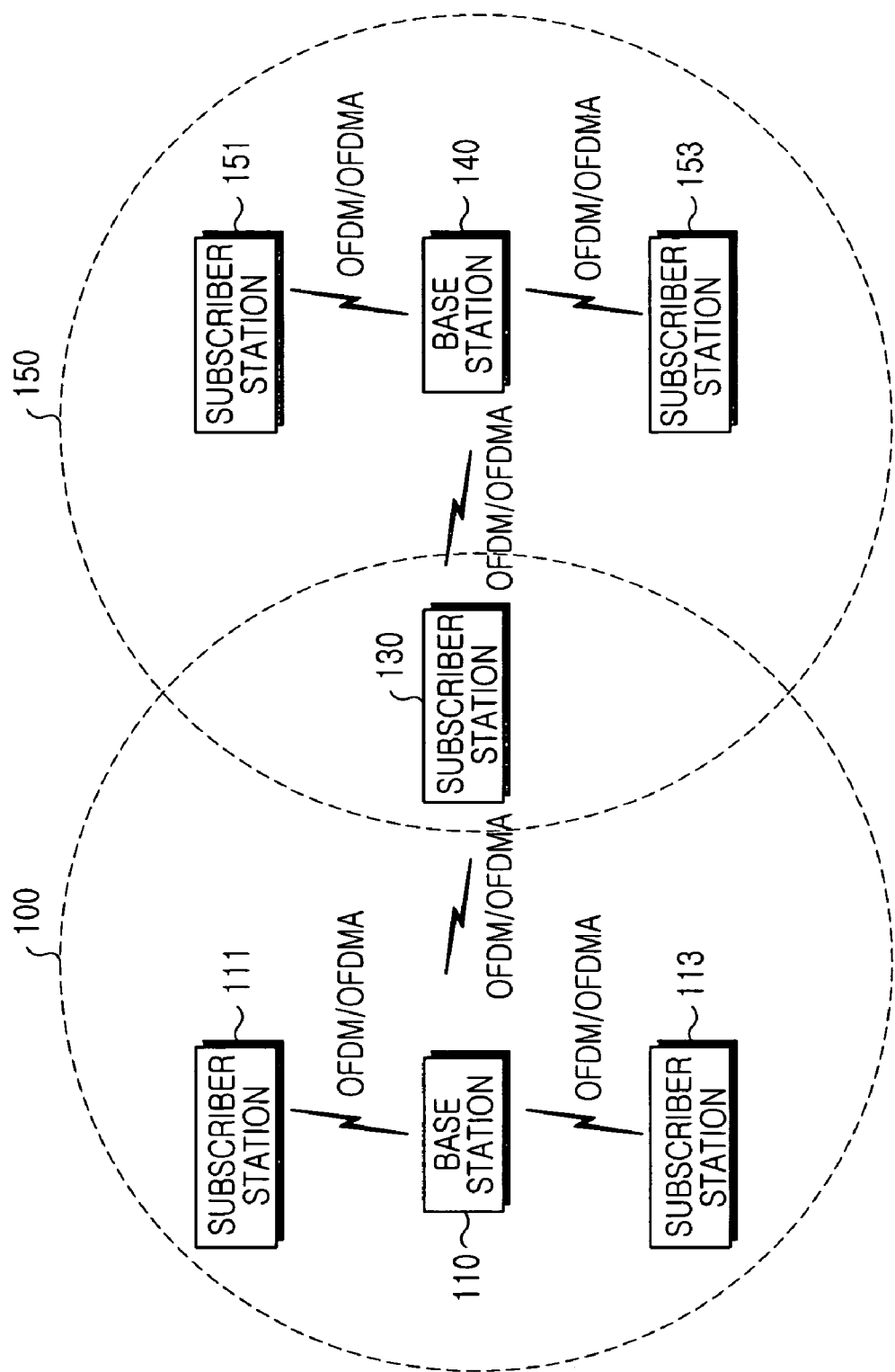
FIG. 8 is a diagram illustrating a structure of a broadband wireless access communication system using an orthogonal frequency division multiplexing method and an orthogonal frequency division multiple access method according to one embodiment of the present invention.

FIG. 8 is a diagram illustrating a structure of a broadband wireless access communication system using an orthogonal frequency division multiplexing method and an orthogonal frequency division multiple access method.

It is noted that an IEEE (Institute of Electrical and Electronics Engineers) 802.16e communication system is achieved by supplementing an IEEE 802.16a communication system with means to compensate for the mobility of a subscriber station SS When the IEEE 802.16e communication system is compensates for the mobility of the subscriber station, a multi-cell structure and handoff of the subscriber station between multi-cells can be considered. According to the present invention, a structure of the IEEE 802.16e communication system is proposed as shown in FIG. 8.

The IEEE 802.16e communication system is a broadband wireless access (BWA) communication system using an orthogonal frequency division multiplexing (hereinafter, referred to as 'OFDM') method and an orthogonal frequency division multiple access (hereinafter, referred to as 'OFDMA') method. In FIG. 8, the BWA communication system using the OFDM/OFDMA method will be described as one example of the IEEE 802.16e communication system.

Referring to FIG. 8, the IEEE 802.16e communication system has a multi-cell structure and includes a base station BS 110 controlling a first cell 100, a base station 140 controlling a second cell 150, and a plurality of subscriber stations 111, 113, 130, 151, and 153.

The base stations 110 and 140 communicate with the subscriber stations 111, 113, 130, 151, and 153 through the OFDM/OFDMA methods. The subscriber station 130 of the subscriber stations 111, 113, 130, 151, and 153 is located at a boundary area between two cells, i.e., at an handoff area. The IEEE 802.16e communication system provides means for compensating for the mobility of the subscriber station 130 only when a handoff function for the subscriber station 130 has been provided.

Since methods for providing the handoff in the IEEE 802.16a, communication system which does not provide the handoff function, do not directly relate to the present invention, a detailed description thereof will be omitted.

As shown in FIG. 8, since the IEEE 802.16e communication system is achieved by supplementing the IEEE 802.16a communication system with means for compensating the mobility of the subscriber station, power consumption of the subscriber station is a major factor to be considered while designing the IEEE 802.16e communication system. In order to minimize power consumption of the subscriber station, a sleep mode operation and an awake mode operation corresponding to the sleep mode operation between the subscriber station and the base station, have been proposed.

As described above, the sleep mode operation and the awake mode operation proposed for the current IEEE 802.16e communication system exhibits problems in that there are no methods for controlling an operation after the sleep interval reaches a maximum window value when establishing the sleep interval.

The methods proposed by the present invention of establishing the sleep interval include a first method of continuously maintaining the sleep interval value as the maximum window value, and a second method of continuously repeating operations, in which the sleep interval value is set as the minimum window value and the sleep interval value is increased up to the maximum window value. Also, a third method of transmitting a sleep request message for establishing a new sleep interval when the sleep interval value reaches the maximum window value is contemplated.

According to the first method and the second method of the present invention, the sleep mode is performed by using predetermined window values without considering the status of communication traffic between the base station and each subscriber station.

In the third method according to the present invention the subscriber station requests from the base station the sleep request message for establishing a new sleep interval whenever the sleep interval value reaches the maximum window value, and receives a response corresponding to the sleep request message in order to establish the sleep mode.

A method for effectively establishing the sleep interval by considering the above-described three methods will now be described according to the present invention.

Figure 9:
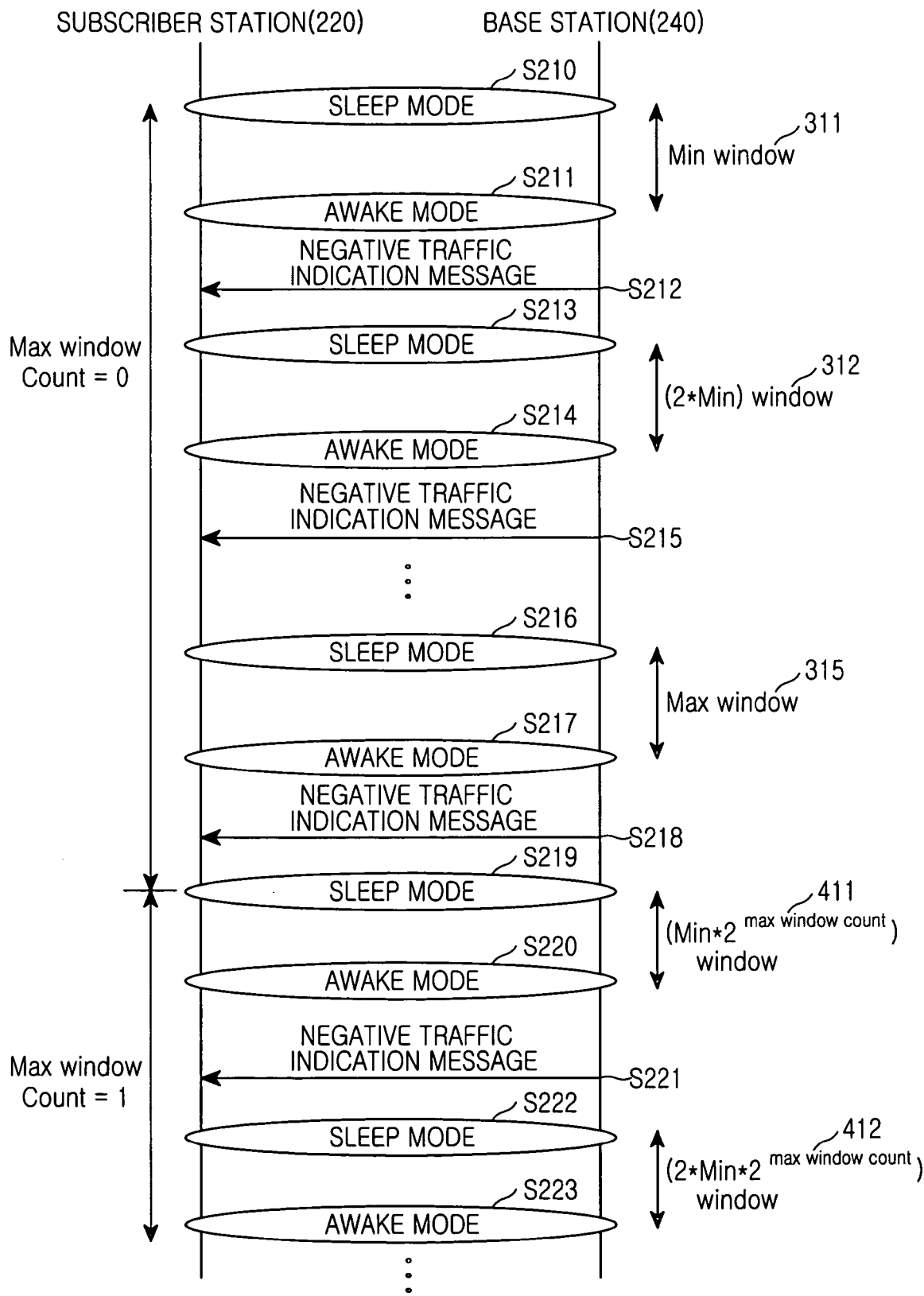
FIG. 9 is a diagram illustrating a method for establishing a sleep interval of a subscriber station when performing a sleep mode loop according to a preferable embodiment of the present invention.

FIG. 9 is a diagram of a method for establishing a sleep interval of a subscriber station when performing a sleep mode loop according to a preferred embodiment of the present invention.

A sleep mode loop refers to a process where the sleep mode is repeatedly performed from a new established minimum window value to the maximum window value after the sleep mode has been performed during a previously established interval until the sleep interval starts from the minimum window value and reaches the maximum window value.

When the base station has no data to transmit, the base station transmits to the subscriber station a traffic indication message having negative information. The subscriber station, which has received the traffic indication message having negative information, continuously stays in the sleep mode. Since data to be transmitted by the base station is not transmitted in real time, the data is randomly generated.

When the sleep interval reaches the maximum window, the minimum window value is doubled after establishing the minimum window value greater than the initial minimum window value.

Referring to FIG. 9, the subscriber station 220 receives information representing the minimum window value, the maximum window value, and a listening interval which are transmitted from the base station 240 and sets a maximum window count as '0' (Max Window Count (C)=0).

The subscriber station 220 maintains the sleep mode during the sleep interval 311 corresponding to the minimum window value (S210). The subscriber station 220, which has performed the mode change into the sleep mode (S210), performs the mode change into the awake mode (S211) after the minimum window value 311 lapses, thereby receiving the traffic indication message from the base station 240 (S212). At this time, the awake mode is a mode for allowing the subscriber station 220 to receive the traffic indication message from the base station 240 during the listening interval.

If the traffic indication message transmitted from the base station 240 is a negative traffic indication message, the subscriber station 220 performs the mode change into a second sleep mode in a first sleep mode loop (S213). At this time, the subscriber station 220 sets the sleep interval as twice that of the first sleep interval, i.e., the minimum window value (2*Min-Window) 312. The subscriber station 220 now in the second sleep mode, performs the mode change into the awake mode after the preset time, which is double that of a time required for the first sleep interval, lapses (S214). The subscriber station 220 receives the traffic indication message from the base station 240 (S215).

When the negative traffic indication message is received as the traffic indication message, the subscriber station 220 establishes the sleep interval in the same manner as described above until the sleep interval reaches the maximum window value. The subscriber station 220 repeats the sleep mode in the sleep interval and the awake mode in the listening interval depending the above-established sleep interval.

If the sleep interval reaches the maximum window value, the subscriber station 220 maintains the sleep mode during the sleep interval 315 corresponding to the maximum window value. The subscriber station 220 then performs the mode change into the awake mode after the sleep interval 315 of the maximum window value lapses (S217). The subscriber station 220 receives the traffic indication message from the base station 240 (S218). If a received traffic indication message is the negative traffic indication message, the subscriber station 220 performs a second sleep mode loop in order to operate in the sleep mode.

The subscriber station 220 establishes a maximum window count as '1' (Max Window Count (C)=C+1=0+1=1) in order to perform the second sleep mode loop. Also, the subscriber station 220 establishes the minimum window value on the basis of following Equation 1.

$$MinWindow = initialMinWindow * 2^{MaxWindowCount} \quad (1)$$

On the assumption that the initial minimum window value is 2 ms in the first sleep mode loop, the minimum window value is 4 ms in the second sleep mode loop.

The subscriber station 220 then maintains the sleep mode during the sleep interval 411 corresponding to a established minimum window value. If the sleep interval 411 lapses, the subscriber station 220 performs the mode change into the awake mode (S220), thereby receiving the traffic indication message from the base station 240 (S221).

If the received traffic indication message is the negative traffic indication message, the subscriber station 220 performs the mode change into the sleep mode (S222). At this time, the subscriber station 220 establishes the sleep interval used for remaining in the sleep mode as double that of the previous sleep interval. After the subscriber station 220 maintains the sleep mode during double time 412 as compared with the previous sleep mode, the subscriber station 220 performs the mode change into the awake mode (S223).

If the subscriber station 220 does not receive a positive traffic indication message from the base station, the subscriber station 220 repeatedly performs the sleep mode loop in the same manner as described above. At this time, if the minimum window value of the sleep interval exceeds the maximum window value, the subscriber station 220 establishes the sleep interval established in the previous sleep mode as the sleep interval for a present sleep mode.

When sleep interval reaches the maximum window value from the minimum window value through performing the sleep mode, the sleep mode loop is carried out so as to set the minimum window value as integer multiple of the initial minimum window value. In addition, on the basis of the predetermined minimum window value, the sleep mode loop is repeatedly carried out such that the sleep mode is performed until the sleep interval reaches the maximum window value. Whenever the sleep mode loop is repeated, the minimum window value is established as a multiple of the minimum window value of the previous sleep mode loop. Even if the sleep interval starting from the minimum window value reaches the maximum window value, the sleep mode loop is realized. The sleep interval can be established depending on communication traffic conditions for data transmission carried out between the base station and the subscriber station.

According to another embodiment of the present invention, the sleep interval can also be established by considerating communication traffic conditions between the base station and the subscriber station in both sleep mode and awake mode of the broadband wireless access communication system using the OFDM/OFDMA method, i.e., the IEEE 802.16e communication system so that it is possible to reduce unnecessary awaking times. As a result, the power save of the IEEE 802.16e communication system, which is an object-of the sleep mode, can be efficiently achieved.

Figure 10:
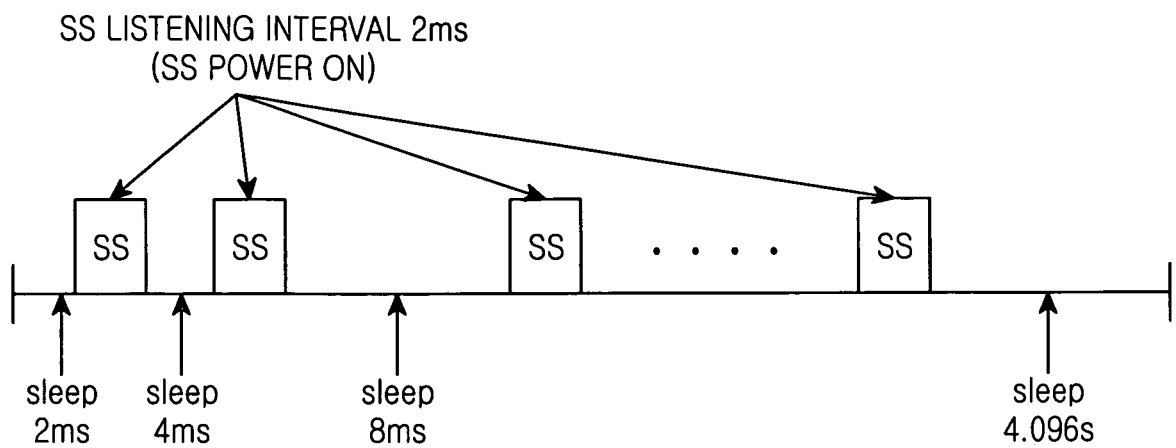
FIG. 10 is a diagram illustrating parameters in relation to a sleep mode when performing an initial sleep mode loop on the basis of FIG. 9.

FIG. 10 is a diagram of parameters in relation to the sleep mode when performing an initial sleep mode loop according to the method of FIG. 9.

Referring to FIG. 10, the maximum window count is set to '0' (Max Window Count (C)=0), the minimum window value is set to 2 ms (Min Window=2 ms), the maximum window value is set to 5 sec (Max Window=5 sec), the listening interval is set to 2 ms (Listening interval=2 ms), and a present sleep interval is set to 2 times the previous sleep interval.

As described above, after the subscriber station maintains the sleep mode for 2 ms which is the initial window value, i.e. the minimum window value, the subscriber station is powered on for 2 ms and maintains the awake mode during the listening interval. After the subscriber station maintains the awake mode for 2 ms, the subscriber station performs the mode change into the sleep mode and maintains the sleep mode for 4 ms.

As shown in FIG. 10, a last sleep interval window value is 4.096 sec, which is less than the maximum window value.

Figure 11:
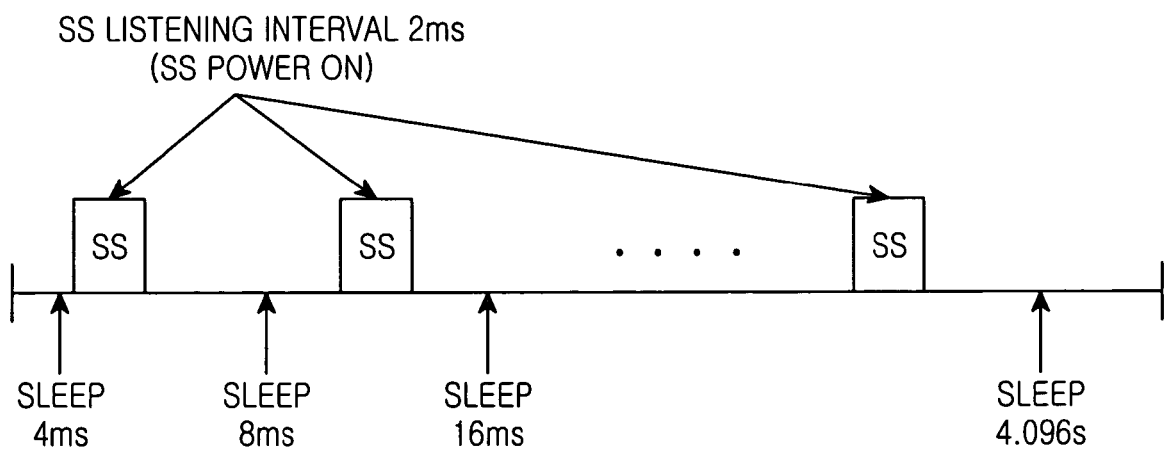
FIG. 11 is a diagram illustrating parameters in relation to a sleep mode when performing a second sleep mode loop on the basis of FIG. 9.

FIG. 11 is a diagram of parameters in relation to the sleep mode when performing the second sleep mode loop according to the method of FIG. 9.

The maximum window count is set to '1' (C=C+1), the minimum window value is set to 4 ms (=2 ms*2) calculated by using equation 1, the maximum window value is set to 5 sec (Max Window=5 sec), the listening interval is set to 2 ms (Listening interval=2 ms), and the current sleep interval is set to 2 times the previous sleep interval.

After the subscriber station maintains the sleep mode in the second sleep loop for 4 ms, which is the minimum window value, the subscriber station is powered on for 2 ms and maintains the awake mode during the listening interval. After the subscriber station maintains the awake mode for 2 ms, the subscriber station performs the mode change into the sleep mode and maintains the sleep mode for 8 ms.

As shown in FIG. 11, the last sleep interval window value is 4.096 sec, which is less than the maximum window value.

When the subscriber station performs the sleep mode in the same manner as described above, power consumption can be greatly reduced as compared to when the subscriber station performs the sleep mode in the first sleep mode loop.

Figure 12:
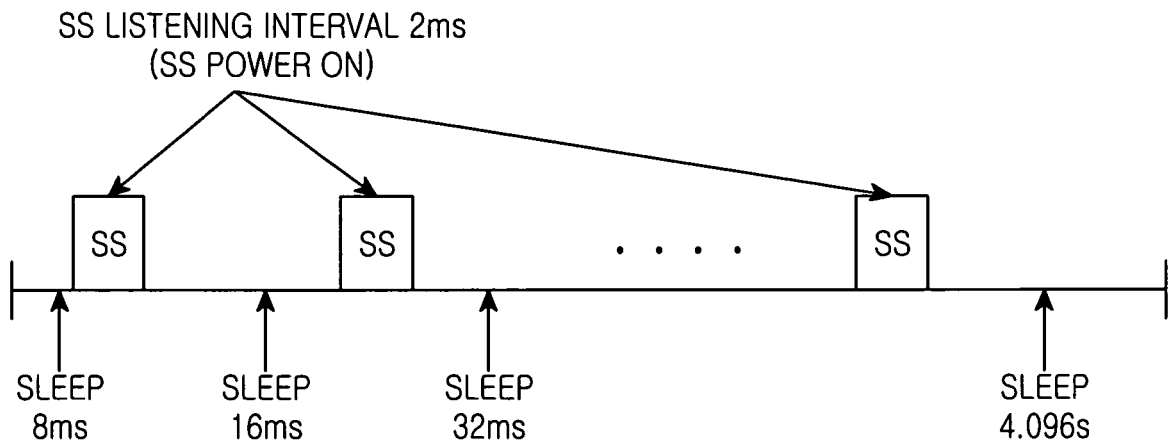
FIG. 12 is a diagram illustrating parameters in relation to a sleep mode when performing a third sleep mode loop on the basis of FIG. 9.

FIG. 12 is a diagram of parameters in relation to the sleep mode when performing a third sleep mode loop according to the method of FIG. 9.

The maximum window count is set to 2 (C=C+1), the minimum window value is set to 8 ms (=2 ms*$2^2$) calculated by using equation 1, the maximum window value is set to 5 sec (Max Window=5 sec), the listening interval is set as '2 ms' (Listening interval=2 ms), and the current sleep interval is set to 2 times the previous sleep interval.

After the subscriber station maintains the sleep mode in the second sleep loop for 8 ms, which is the minimum window value, the subscriber station is powered on for 2 ms and maintains the awake mode during the listening interval. After the subscriber station maintains the awake mode for 2 ms, the subscriber station performs the mode change into the sleep mode and maintains the sleep mode for 16 ms.

As shown in FIG. 12, the last sleep interval window value is 4.096 sec, which is less than the maximum window value.

When the subscriber station performs the sleep mode in the same manner as described above, power consumption can be reduced as compared to when the subscriber station performs the sleep mode in the second sleep mode loop.

Figure 13:
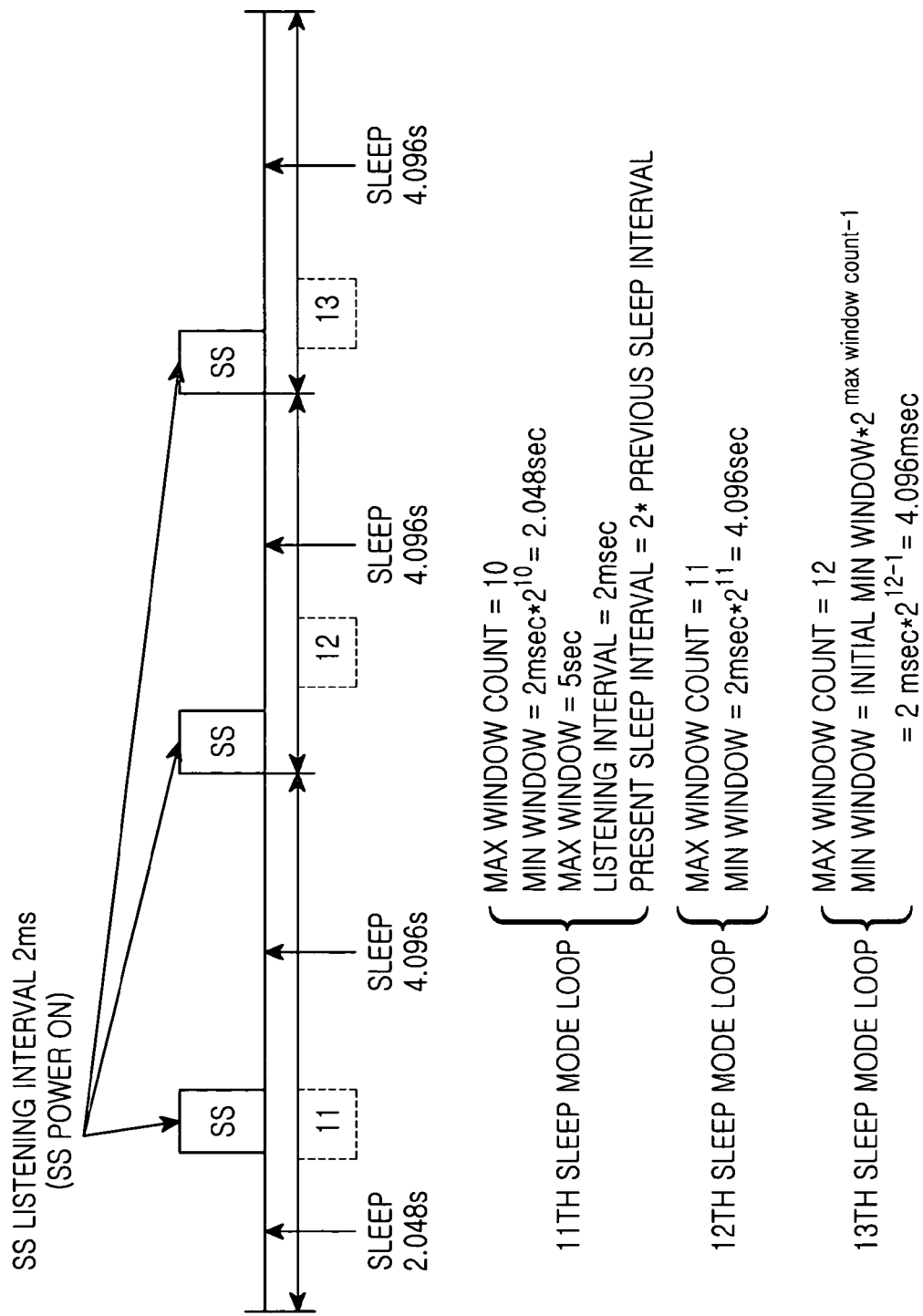
FIG. 13 is a diagram illustrating parameters in relation to a sleep mode when performing a $11^{th}$, a $12^{th}$, and a $13^{th}$ sleep mode loop on the basis of FIG. 9.

FIG. 13 is a diagram of parameters in relation to the sleep mode when performing $11^{th}$, $12^{th}$, and $13^{th}$ sleep mode loops according to the method of FIG. 9.

When the subscriber station performs the $11^{th}$ sleep mode loop, the maximum window count is set to 10 (C=C+1), the minimum window value is set to 2.048 sec (=2 ms*$2^{10}$) calculated by using equation 1, the maximum window value is set to 5 sec (Max Window=5 sec), the listening interval is set to 2 ms (Listening interval=2 ms), and the current sleep interval is set to 2 times the previous sleep interval.

After the subscriber station maintains the sleep mode in the $11^{th}$ sleep loop for 2.048 sec, which is the minimum window value, the subscriber station is powered on for 2 ms and maintains the awake mode during the listening interval. After the subscriber station maintains the awake mode for 2 ms, the subscriber station performs the mode change into the sleep mode and maintains the sleep mode for 4.096 sec.

As shown in FIG. 13, the last sleep interval window value is 4.096 sec, which is less than the maximum window value.

When the subscriber station performs the sleep mode in the same manner as described above, power consumption can be reduced as compared with when the subscriber station performs the sleep mode in the previous sleep mode loop.

When the subscriber station performs the 12th sleep mode loop, the maximum window count is set to 11 (C=C+1), the minimum window value is set to 4.096 sec (=2 ms*$2^{11}$) calculated by using equation 1, the maximum window value is set to 5 sec (Max Window=5 sec), the listening interval is set to 2 ms (Listening interval=2 ms), and the current sleep interval is set to 2 times the previous sleep interval.

After the subscriber station maintains the sleep mode in the $12^{th}$ sleep loop for 4.096 sec, which is the minimum window value, the subscriber station is powered on for 2 ms and maintains the awake mode during the listening interval. After the subscriber station maintains the awake mode for 2 ms, the subscriber station performs the mode change into the sleep mode and the sleep mode for 4.096 sec.

When the subscriber station performs the $13^{th}$ sleep mode loop, the maximum window count is greater set to 12 (C=C+1). As the minimum window value calculated by using equation 1 is larger than the maximum window value, the minimum value calculated by using Equation 2 (below) is 4.096 sec (=2 ms*$2^{12-1}$). The maximum window value is set to 5 sec (Max Window=5 sec), the listening interval is set to 2 ms (Listening interval=2 ms), and the current sleep interval is set to 2 times the previous sleep interval.

$$\text{MinWindow} = \text{initial MinWindow} * 2^{MaxWindowCount-1} \quad (2)$$

After the subscriber station maintains the sleep mode in the $13^{th}$ sleep loop for 4.096 sec, which is the minimum window value, the subscriber station is powered on for 2 ms and maintains the awake mode during the listening interval. After the subscriber station maintains the awake mode for 2 ms, the subscriber station performs the mode change into the sleep mode and maintains the sleep mode for 4.096 sec.

When the subscriber station performs the sleep mode in the same manner as described above, power consumption can be reduced as compared with when the subscriber station performs the sleep mode in the previous sleep mode loop.

Figure 14:
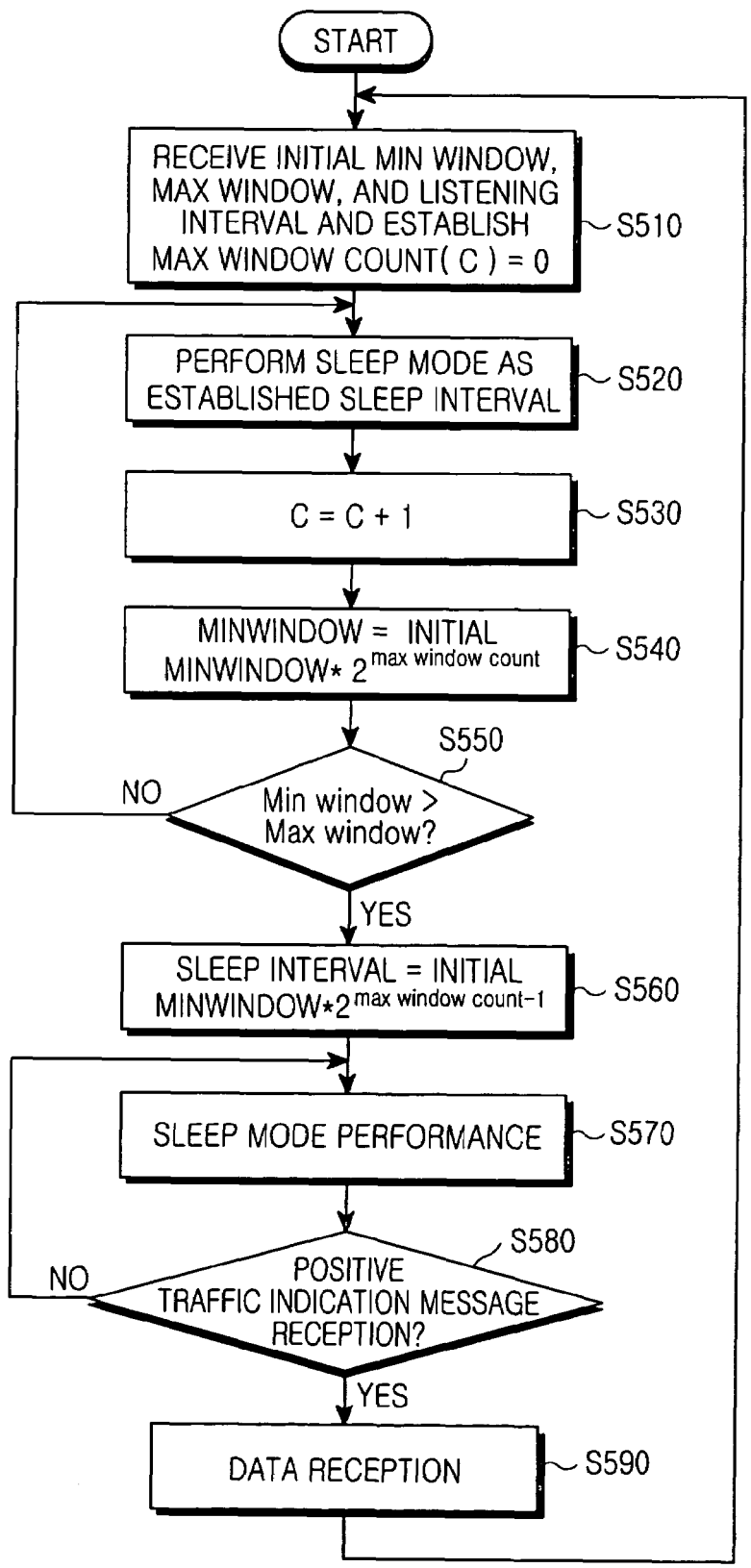
FIG. 14 is a flow chart of the operation of a subscriber station when employing the method of FIG. 9.

FIG. 14 is a flow chart showing an operation of the subscriber station based on FIG. 9.

The subscriber station receives information representing the initial minimum window value, the maximum window value, and the listening interval and establishes the maximum window count as '0' (S510). The subscriber station performs the sleep mode operation depending on the sleep interval established until the sleep interval reaches the maximum window value during the sleep mode loop (S520).

If the sleep interval reaches the maximum window value while performing the sleep mode, the subscriber station adds '1' to the maximum window count (S530). Also, as shown in Equation 1, the minimum window value is calculated by multiplying the initial minimum window value by 2 raised to the maximum window count of a current sleep mode loop power (S540).

At this time, the subscriber station compares the above-calculated minimum window value with the maximum window value (S550). If the subscriber station determines that the minimum window value calculated by step 540 is less than the maximum window, the subscriber station repeatedly performs steps 520 to 550 performing the sleep mode according to the established sleep interval.

If the subscriber station determines that the minimum window value calculated by step 540 is greater than the maximum window value, the subscriber terminal calculates the sleep interval by Equation 2 (S560). After the subscriber station maintains the sleep mode during the calculated sleep interval, the subscriber station performs the sate transition into the awake mode and maintains the awake mode for 2 ms, and then the subscriber station repeatedly performs the sleep mode again during the sleep interval calculated in step 560 (S570).

The subscriber station determines whether or not the positive traffic indication message is received during the listening interval of the awake mode in step 570 (S580). If the positive traffic indication message is not received, the subscriber station repeatedly performs the sleep mode by using the sleep interval calculated in step 560.

If the positive traffic indication message is received in step 580, the subscriber station performs the mode change into the awake mode by turning on its power, to thereby receive data from the base station (S590).

After the subscriber station receives the positive traffic indication message from the base station and communicates data with the base station, the subscriber station initializes the minimum window value and the maximum window count. In other words, the subscriber station establishes the minimum window value as the initial window value (2 ms), resets the maximum window count as '0', and then performs step 510 to step 590.

When sleep interval reaches the maximum window value from the minimum window value through performing the sleep mode, the sleep mode loop is carried out so as to set the minimum window value as an integer multiple of the initial minimum window value. On the basis of the predetermined minimum window value, the sleep mode loop is repeatedly carried out such that the sleep mode is performed until the sleep interval reaches the maximum window value. Whenever the sleep mode loop is repeated, the minimum window value is established at multiples of the minimum window value of the previous sleep mode loop. Even if the sleep interval starting from the minimum window value reaches the maximum window value, the sleep mode loop is realized. The sleep interval can be established depending on communication traffic conditions for data transmission carried out between the base station and the subscriber station.

Also, the sleep interval can be established by considerating the communication traffic conditions between the base station and the subscriber station in both sleep mode and awake mode of the broadband wireless access communication system using the OFDM/OFDMA method, i.e., the IEEE 802.16e communication system, so that it is possible to reduce unnecessary awaking times. As a result, the power save of the IEEE 802.16e communication system, which is an object of the sleep mode, can be efficiently achieved.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for establishing by a subscriber station a sleep interval of a sleep mode in a communication system, the method comprising the steps of:
   a first step of repeating an operation for maintaining the sleep mode during a sleep interval corresponding to a window value and then shifting into an awake mode so as to receive a traffic indication message from a base station, while changing a present sleep interval to have a value larger than that of a previous sleep interval within a range from a minimum window value to a maximum window value so long as a positive traffic indication message is not received;
   a second step of exponentially increasing the minimum window value if the positive traffic indication message is not received until the window value becomes the maximum window value in the first step;
   a third step of returning to the first step if the increasing minimum window value belongs to a range of the maximum window value in the second step;
   a fourth step of, if the increasing minimum window value is greater than the maximum window value in the second step, repeating an operation for maintaining the sleep mode during a sleep interval corresponding to a present minimum window value and then shifting into the awake mode so as to receive the traffic indication message from the base station, so long as the positive traffic indication message is not received; and
   a fifth step of receiving data from the base station if the positive traffic indication message is received in the first step or the fourth step.

2. The method as claimed in claim 1, further comprising receiving an initial minimum window value, the maximum window value, and a listening interval, in which the traffic indication message is received after shifting into the awake mode, from the base station before the first step is initially performed.

3. The method as claimed in claim 1, further comprising receiving an initial minimum window value, the maximum window value, and a listening interval, in which the traffic indication message is received after shifting into the awake mode, from the base station, and setting a maximum window count to have a value of 0 before the first step is initially performed,
   wherein the subscriber station increases the maximum window count by '1' whenever a number of performances of the first step increases, and calculates the minimum window value according to
   $MinWindow = initialMinWindow * 2^{MaxWindowCount}$,
   wherein the MinWindow denotes the minimum window value, the initialMinWindow denotes the initial minimum window value, and the MaxWindowCount denotes the maximum window count.

4. The method as claimed in claim 3, wherein, if the calculated minimum window value is greater than the maximum window value, the subscriber station calculates the minimum window value according to MinWindow initial $MinWindow * 2^{MaxWindowCount-1}$,
   wherein the MinWindow denotes the minimum window value, the initialMinWindow denotes the initial minimum window value, and the MaxWindowCount denotes the maximum window count.

5. The method as claimed in claim 4, further comprising returning to the first step after receiving corresponding data and then initializing the minimum window value and the maximum window count if the positive traffic indication message is received,
   wherein the traffic indication message represents if data to be transmitted from the base station exists.

6. The method as claimed in claim 1, further comprising returning to the first step after receiving corresponding data if the positive traffic indication message is received,
   wherein the traffic indication message represents if data to be transmitted from the base station exists.

7. The method as claimed in claim 1, wherein the present sleep interval is fixed to the minimum window value in the fourth step.

8. The method as claimed in claim 1, wherein the present sleep interval, except for the minimum window value, is twice as long as the previous sleep interval in the first step.

9. The method as claimed in claim 2, wherein the initial minimum window value is 2 ms, the maximum window value is 5 ms, and the listening interval is 2 ms.

10. The method as claimed in claim 1, wherein the window value changes so that the present sleep interval increases by a certain multiple of the previous sleep interval in a sleep mode loop of the first step or the second step.

11. A method for establishing by a subscriber station a sleep interval of a sleep mode in a communication system, the method comprising the steps of:
    a first step of receiving an initial minimum window value, a maxiniwn window value, and a listening interval from a base station, and setting a maximum window count to have a value of 0;
    a second step of performing a sleep mode loop;
    a third step of increasing the maximum window count by '1' after performing the sleep mode loop;
    a fourth step of calculating a minimum window value according to $MinWindow = initialMinWindow * 2^{MaxWindowCount}$,
    wherein the MinWindow denotes the minimum window value, the initialMinWindow denotes the initial minimum window value, and the MaxWindowCount denotes the maximum window count;
    a fifth step of returning to the second step if the minimum window value is not greater than the maximum window value;
    a sixth step of calculating the minimum window value according to $MinWindow = initialMinWindow * 2^{MaxWindowCount-1}$;
    a seventh step of performing the sleep mode during a sleep interval corresponding to the minimum window value calculated in the sixth step, shifting into an awake mode, and determining if a positive traffic indication message is received from the base station; and
    an eighth step of returning to the first step after receiving corresponding data from the base station if the positive traffic indication message is received, and returning to the seventh step if the positive traffic indication message is not received,
    wherein the second step repeats a sleep-listening step including a sub-step of maintaining the sleep mode during a sleep interval corresponding to a certain window value and a sub-step of shifting into the awake mode from the sleep mode so as to receive a traffic indication message from the base station during a certain listening interval, and performs a subsequent sleep-listening step when the received traffic indication message is a negative traffic indication message, and
    wherein the window value in the second step is changeable from the initial minimum window value or the minimum window value, which is calculated in the fourth step, to the maximum window value.

12. The method as claimed in claim 11, wherein the window value changes so that the present sleep interval increases by a certain multiple of the previous sleep interval in the second step.

* * * * *